United States Patent
Buckley et al.

(10) Patent No.: US 9,626,171 B2
(45) Date of Patent: Apr. 18, 2017

(54) COMPOSING A MODULE SYSTEM AND A NON-MODULE SYSTEM

(71) Applicant: Oracle International Corporation, Redwood Shores, CA (US)

(72) Inventors: Alexander R. Buckley, Cupertino, CA (US); Mark B. Reinhold, Menlo Park, CA (US); Jonathan J. Gibbons, Mountain View, CA (US); Alan E. Bateman, Dublin (IE); Mandy L. Chung, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1 day.

(21) Appl. No.: 14/808,590

(22) Filed: Jul. 24, 2015

(65) Prior Publication Data

US 2017/0024196 A1 Jan. 26, 2017

(51) Int. Cl.
- G06F 9/44 (2006.01)
- G06F 9/45 (2006.01)
- G06F 9/445 (2006.01)

(52) U.S. Cl.
CPC .................. G06F 8/54 (2013.01); G06F 8/41 (2013.01); G06F 8/20 (2013.01); G06F 8/71 (2013.01); G06F 9/44505 (2013.01)

(58) Field of Classification Search
CPC .......... G06F 8/71; G06F 9/44505; G06F 8/20; G06F 8/41; G06F 8/447; G06F 9/45516; G06F 9/44521; G06F 8/54

See application file for complete search history.

(56) References Cited

U.S. PATENT DOCUMENTS

| | | | | |
|---|---|---|---|---|
| 7,503,031 | B2 * | 3/2009 | Chang | G06F 8/20 |
| | | | | 717/101 |
| 8,584,104 | B2 * | 11/2013 | Gibbons et al. | 717/140 |
| 9,069,568 | B2 * | 6/2015 | Schmidt et al. | |
| 9,116,707 | B2 * | 8/2015 | Reinhold et al. | |
| 9,292,315 | B1 * | 3/2016 | Dawson | G06F 9/44521 |
| 9,298,448 | B2 * | 3/2016 | Eliaš | G06F 8/70 |
| 9,323,501 | B1 * | 4/2016 | Ielceanu | G06F 8/31 |
| 2003/0009747 | A1 * | 1/2003 | Duran | G06F 8/76 |
| | | | | 717/137 |
| 2004/0181471 | A1 * | 9/2004 | Rogers | G06Q 40/123 |
| | | | | 705/31 |

(Continued)

OTHER PUBLICATIONS

Reis et al., "A Module System for C++", May 2014, Modules SG, pp. 1-22; <https://pdfs.semanticscholar.org/81e0/f5a49cd6f467cbc57f5f139a69579bd6366a.pdf>.*

(Continued)

*Primary Examiner* — Thuy Dao
*Assistant Examiner* — Ben C Wang
(74) *Attorney, Agent, or Firm* — Invoke

(57) ABSTRACT

A bridge module is generated to bridge standard modules in a module system and non-module code in a non-module system. The bridge module includes explicit dependencies associated with a namespace, such as a dependency path corresponding to the non-module code. The bridge module exposes packages of the non-module code at least to the standard modules. Operations are performed on a code base that uses standard modules, bridge modules, and non-module code.

19 Claims, 9 Drawing Sheets

(56) References Cited

U.S. PATENT DOCUMENTS

| | | | |
|---|---|---|---|
| 2006/0101092 A1* | 5/2006 | Ishida | G06F 8/71 |
| 2008/0091792 A1* | 4/2008 | Mei | G06F 9/44505 709/217 |
| 2008/0276231 A1 | 11/2008 | Huang et al. | |
| 2009/0070792 A1* | 3/2009 | Cable | G06F 9/44505 719/332 |
| 2009/0100404 A1* | 4/2009 | Chaturvedi | G06F 8/20 717/101 |
| 2009/0133001 A1* | 5/2009 | Rozenfeld | G06F 8/20 717/127 |
| 2009/0164760 A1* | 6/2009 | Sterbenz | G06F 9/44521 712/216 |
| 2011/0239184 A1* | 9/2011 | Feigen | 717/104 |
| 2011/0271254 A1 | 11/2011 | Reinhold et al. | |
| 2011/0302565 A1* | 12/2011 | Ferris | G06F 8/54 7/163 |
| 2011/0321019 A1* | 12/2011 | Gibbons et al. | 717/140 |
| 2012/0096433 A1* | 4/2012 | Reinhold et al. | 717/120 |
| 2012/0151505 A1 | 6/2012 | Verissimo de Oliveira | |
| 2012/0278797 A1* | 11/2012 | Secrist | G06F 8/71 717/176 |
| 2013/0007706 A1* | 1/2013 | Burckart | G06F 8/71 717/120 |
| 2013/0232469 A1* | 9/2013 | Agarwal | G06F 8/71 717/121 |
| 2014/0130020 A1* | 5/2014 | Boshernitsan | G06F 11/3688 717/131 |
| 2014/0137075 A1* | 5/2014 | Said | G06F 21/6218 717/102 |
| 2014/0173574 A1* | 6/2014 | Schmidt et al. | 717/143 |
| 2014/0351802 A1* | 11/2014 | Elias | G06F 8/70 717/166 |
| 2015/0089478 A1* | 3/2015 | Cheluvaraju | G06F 8/71 717/123 |
| 2015/0186129 A1* | 7/2015 | Apte | G06F 9/44505 717/174 |
| 2016/0055014 A1* | 2/2016 | Gallimore | G06F 9/44521 719/320 |

OTHER PUBLICATIONS

Rossberg et al., "Mixin Up the ML Module System", Apr. 2013, ACM, pp. 2:1-2:84; <http://dl.acm.org/citation.cfm?id=2450137&CFID=879059089&CFTOKEN=53876799>.*

Fayçal et al, "An Agent Based Encapsulator System for Integrating and Composing Legacy System Functionalities", Dec. 2015 IEEE, pp. 84-87; <http://ieeexplore.ieee.org/stamp/stamp.jsp?tp=&arnumber=7397340>.*

Stack Overflow, "What's the difference between 'package' and 'module'" (last accessed on Dec. 6, 2016).

NetBeans, "What is a module" (last accessed on Dec. 6, 2016).

* cited by examiner

```
Code Description
     304

A.jar includes class a.AA
   a.AA recites "new b.BB()"
   a.AA recites "new c.CC()"
   a.AA recites "new d.DD()"

B.jar includes class b.BB

C.jar includes class c.CC
   c.CC extends d.DD

D.jar includes class d.DD
```

Initial Operational State at Time T0

Dependency Path 350

CLASSPATH A.jar;B.jar;C.jar;D.jar

Operational State at Time T1
(after modularization of D.jar)

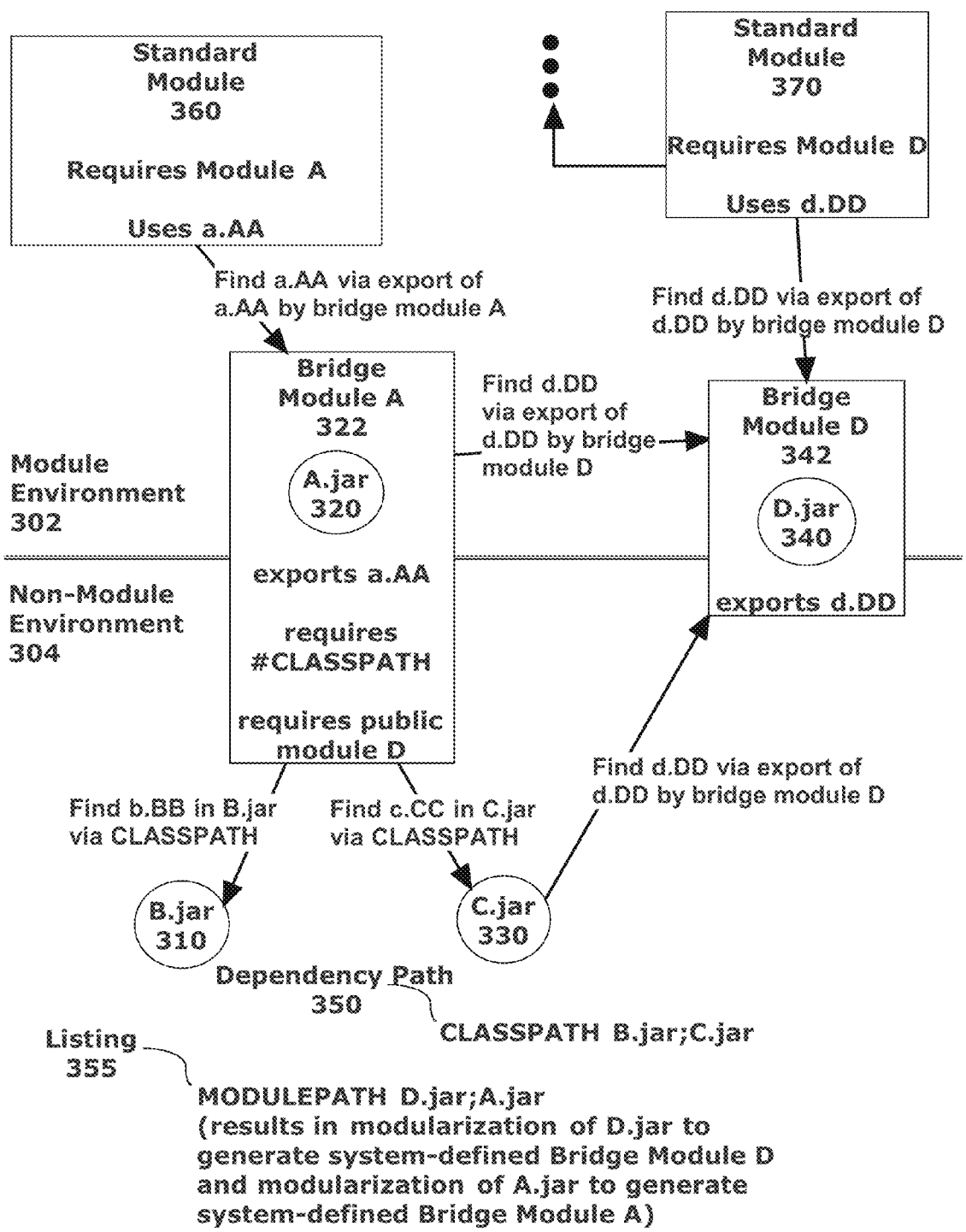

US 9,626,171 B2

COMPOSING A MODULE SYSTEM AND A NON-MODULE SYSTEM

TECHNICAL FIELD

The present disclosure relates to module systems and non-module systems. In particular, the present disclosure relates to techniques for composing a module system and a non-module system.

BACKGROUND

Computing platforms for developing and maintaining software generally rely on one of two kinds of systems: non-module systems and module systems.

A non-module system refers to a system in which dependencies between different pieces of code are not strictly declared or restricted. An industry-defined term "JAR hell" refers to example uses of Java Archive (JAR) files in a non-module system which result in problems, for example, with the class loading process.

A module system includes a collection of standard modules and defines how the collection of standard modules work together. Each particular standard module in the collection of standard modules may explicitly define dependencies on other standard modules (or the contents thereof). However, standard modules are typically restricted from explicitly depending on any non-module code.

FIG. 1A illustrates a system 100 with components of a module environment 102 and components of a non-module environment 130. The non-module environment 130 includes non-module code 132-146. Dependencies between different non-module code are not required to be explicitly declared. Accordingly, when a first non-module code depends on a second non-module code, the software development environment must search for the second non-module code in all files of a set of files associated with all of the code. The dependencies between different non-module code (which may not be explicitly declared) are illustrated in FIG. 1A using arrows. For example, the dependency of non-module code 132 on non-module code 140 is illustrated using an arrow beginning at non-module code 132 and ending at non-module code 140. Furthermore, a dependency of non-module code 140 on non-module code 142 and non-module code 144 is illustrated using two arrow beginning at non-module code 140 and ending at non-module code 142 and non-module code 144, respectively.

The module environment 102 includes a set of standard modules (e.g., standard modules 104-112). Dependencies between different standard modules in a module environment, such as module environment 102, are explicitly declared by the modules. An explicitly declared dependency may be referred to herein as an "explicit dependency." The explicit dependencies between different standard modules (or contents thereof) in module environment 102 are also illustrated using arrows. For example, the explicit dependency of standard module 104 on standard module 108 is illustrated using an arrow starting at standard module 104 and ending at standard module 108. Further, the explicit dependency of standard module 108 on standard module 110 is illustrated using an arrow starting at standard module 108 and ending at standard module 110.

As illustrated in FIG. 1A, there is a partition between module environment 102 and non-module environment 130. Specifically, standard modules cannot explicitly depend on non-module code. For example, standard module 110 cannot explicitly depend on either non-module code 132 or on non-module code 134. As a result, module environments comprising standard modules cannot be built on top of non-module environments comprising non-module code. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A-3D illustrate a detailed example in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. DEVELOPMENT ENVIRONMENT EXAMPLE
4. GENERATING A BRIDGE MODULE FOR BRIDGING A MODULE ENVIRONMENT AND A NON-MODULE ENVIRONMENT
5. EXAMPLE EMBODIMENTS
6. MISCELLANEOUS; EXTENSIONS
7. HARDWARE OVERVIEW

1. General Overview

In an embodiment, a bridge module is generated to bridge standard modules in a module environment and non-module code in a non-module environment. Standard modules from the module environment may depend explicitly on the bridge modules, but may not depend explicitly on the non-module code. Bridge modules may depend on the non-module code. For example, bridge modules may explicitly reference a namespace that corresponds to non-module code. For example, bridge modules may explicitly depend on a dependency path that corresponds to non-module code. Bridge modules may also depend on other bridge modules, and standard modules.

In an embodiment, generating bridge modules includes modularizing non-module code in the non-module environment. Modularization of non-module code may be performed in response to one or more triggering events. Furthermore, modularization requirements may be used for determining whether non-module code may be modularized.

Modularizing non-module code does not necessarily include any modifications to the non-module code itself. Modularizing non-module code includes generating a description for the non-module code for use by other modules. For example, modularizing non-module code includes identifying and exposing packages of the non-module code to a module system via a module descriptor. The packages are exposed by a bridge module to other bridge modules, standard modules, and other non-module code. The dependencies of a bridge module are explicitly noted in a module descriptor but, in at least one embodiment, are not exposed to other components. Modularizing code may further include identifying dependency paths of the non-module code and including the dependency paths in a module descriptor of the corresponding bridge module.

In an embodiment, operations are performed on a non-compiled or compiled code base corresponding at least to a combined set of standard modules, bridge modules, and non-module code. For example, the code base may be complied, validated, or executed by a system.

One or more embodiments described in this Specification and/or recited in the claims may not be included in this General Overview section.

2. Architectural Overview

Figure 1A:
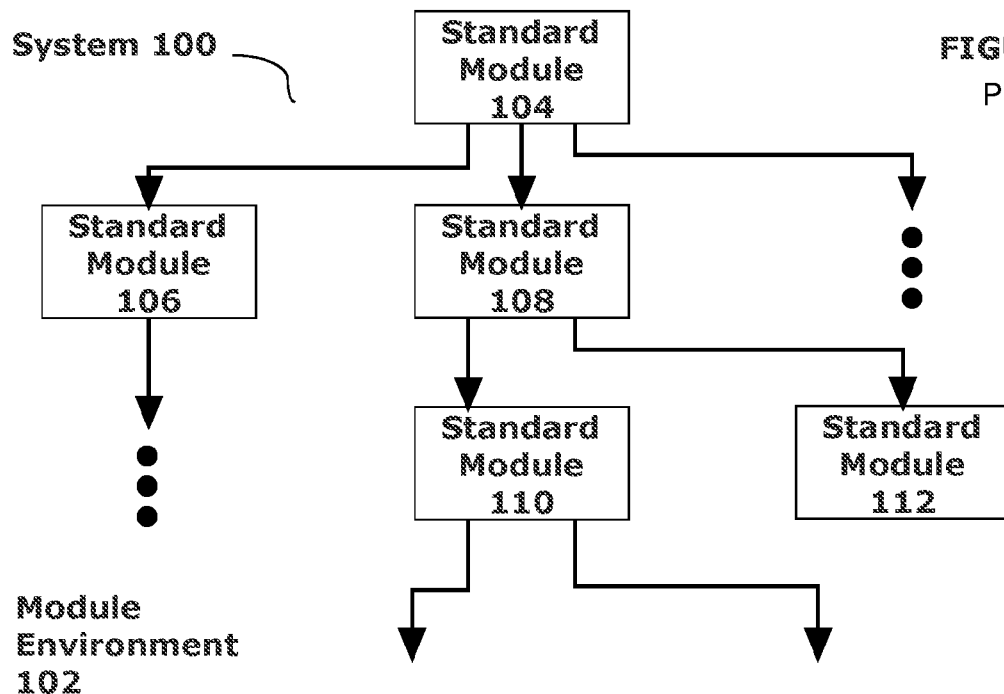
FIG. 1A illustrates standard modules in a module environment and non-module code in a non-module environment.
Figure 1A:
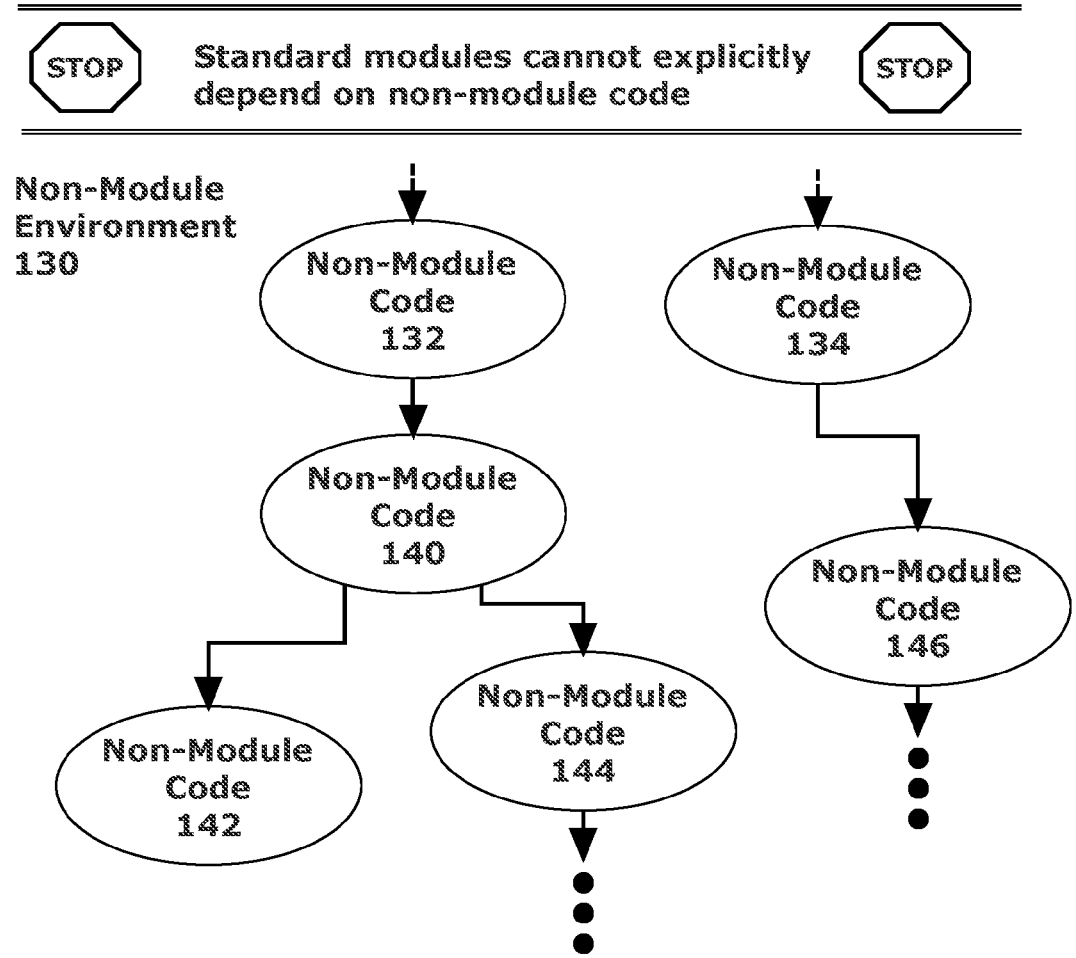
Figure 1B:
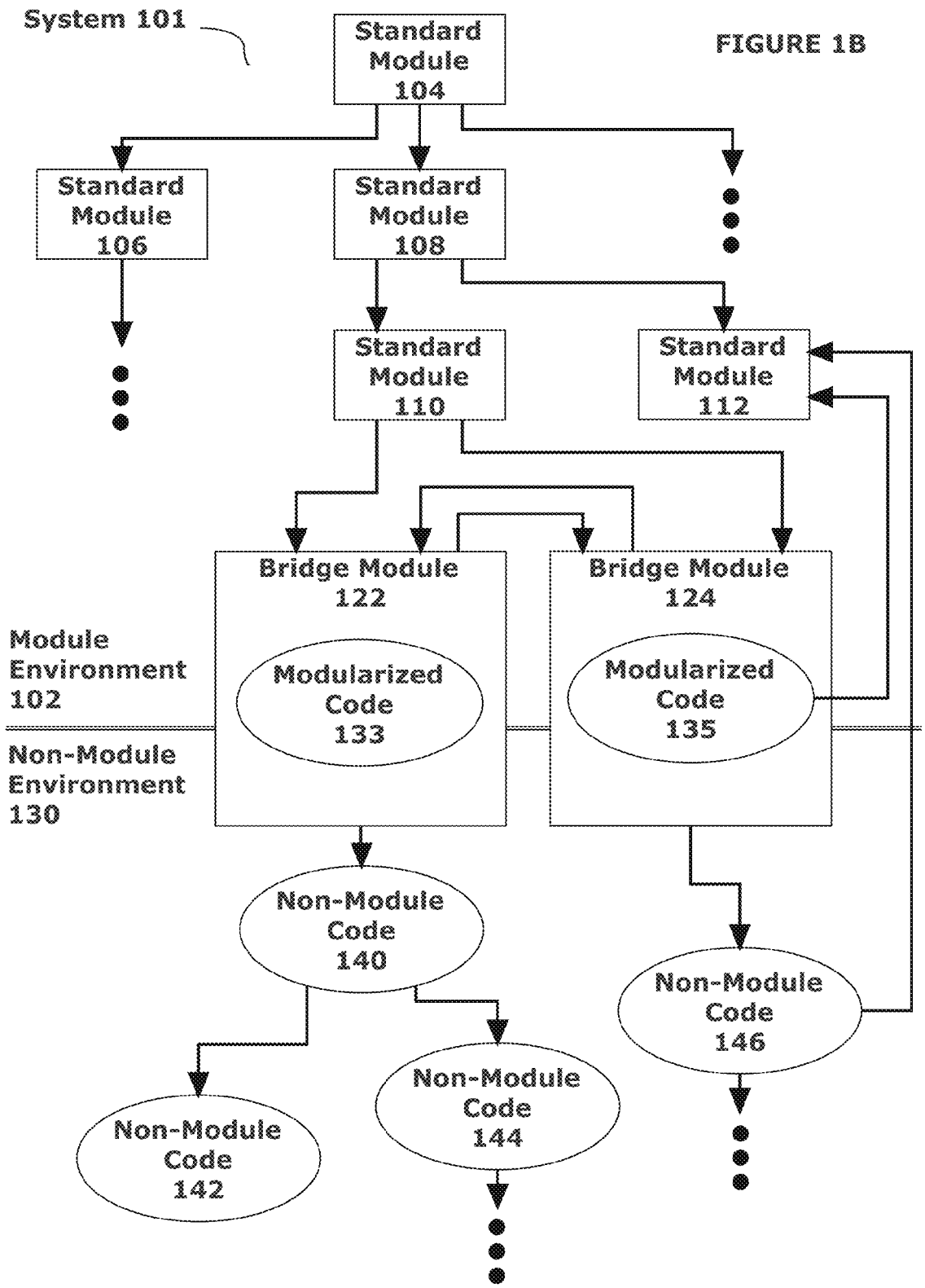
FIGS. 1B and 1C illustrate systems in accordance with one or more embodiments.
Figure 1C:
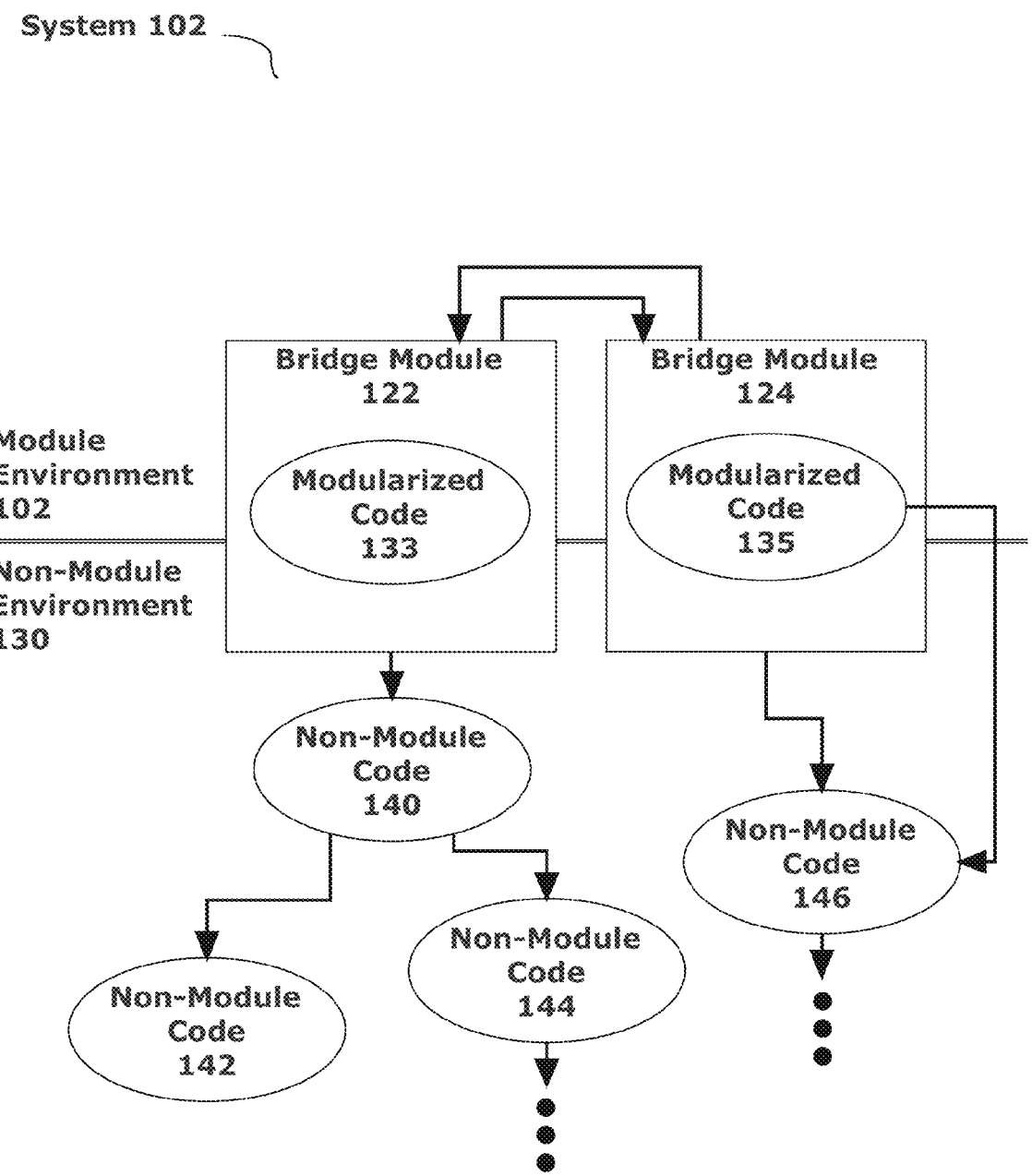

FIGS. 1B and 1C illustrate examples of systems in accordance with one or more embodiments. Other embodiments may include more or fewer devices and more or fewer components than illustrated in the systems and/or described below. Hardware components, software components, and/or functionality described as corresponding to one device may instead correspond to another device. Components illustrated separately may be combined into a single component or implemented on a single device. Accordingly, the scope of the claims should not be construed as being limited by the specific examples herein.

System 101 illustrates components associated with one or both of a module environment 102 and a non-module environment 130. Components within system 101 may depend on other components within system 101 (dependency restrictions described in detail below). In an example, if a first component needs a package or service provided by a second component, the first component depends on the second component.

A dependency between components may or may not be explicitly noted. An explicit dependency for a particular component, as referred to herein, includes a declaration of other components and/or a namespace. A namespace maps names of resources (e.g., Java classes) to resource definitions (e.g., class definitions). In one example, a namespace is implemented as a dependency path. A dependency path may include, as parameters, an ordered set of entities. Each entity may contain and transparently expose a set of named resource definitions (e.g., Java class definitions). In another example, a namespace is implemented as a class loader. A class loader is an entity, containing and transparently exposing a set of named resources definitions (e.g., Java class definitions). Embodiments and examples herein, which refer to a dependency path may be equally applicable to any other namespace, e.g., a class loader.

In an embodiment, a dependency path identifies non-module code that may be, but is not necessarily, depended upon. The dependency path may be stored as an environment variable in a software development environment or stored within a file (e.g., a manifest file).

In an embodiment, the dependency path corresponds to a namespace. A namespace may include a set of identifiers corresponding to respective sets of non-module code. The set of identifiers may be ordered according to a policy. In an example, the namespace identifies a set of Java Archive (JAR) files.

In the Java Module System, a keyword "requires" is used to declare explicit dependencies. The keyword "requires" may be used with a parameter identifying another component or identifying a dependency path (e.g., CLASSPATH). An explicit dependency on a dependency path allows for depending on the parameters associated with the dependency path. In an example, a first component depends on a second component, either directly or via a dependency path. To illustrate a first component depending on a second component in FIG. 1B, an arrow is drawn from the first component to the second component. The arrowhead points to the second component which is being depended upon, directly or via a dependency path, by the first component.

In an illustrated example, the module environment 102 includes a set of standard modules (e.g., standard modules 104-112) which collectively define how the set of standard modules work together, including but not limited to any dependencies thereof. A standard module, as referred to herein, includes any module with a restriction that prohibits explicit dependency on any non-module code (e.g., non-module code 140-146) either directly or via a dependency path. A standard module may include an explicit dependency on other standard modules and/or on bridge modules. Furthermore, a standard module may indirectly depend on non-module code (e.g., via bridge modules as described herein).

In an embodiment, bridge modules may serve as a bridge between standard modules and non-module code. Specifically, bridge modules refer to modules that may (a) be depended upon by standard modules and (b) depend upon non-module code. Bridge modules may depend upon non-module code via an explicit dependency on a dependency path that corresponds to the non-module code. In addition to the functionality to depend on non-module code, bridge modules may depend on other bridge modules and/or on standard modules. Bridge modules expose one or more packages of non-module code to standard modules, other bridge modules, and other non-module code via modularization as described below w/reference to FIG. 2.

In the illustrated example, standard module 108 explicitly depends on standard module 110. Standard module 110 explicitly depends on bridge module 122 and bridge module 124. Bridge module 122 explicitly depends on a dependency path corresponding to non-module code 140. Furthermore, bridge module 122 explicitly depends on bridge module 124. Bridge module 124 explicitly depends on a dependency path corresponding to non-module code 146. Furthermore, bridge module 124 explicitly depends on standard module 112.

In at least one embodiment, use of bridge modules, with characteristics and functionality as described herein, may be restricted. In one example, generation of a bridge module may be restricted to a system or software development environment. Developers that define standard modules may be prohibited from defining module descriptors for bridge modules.

In an embodiment, a system modularizes non-module code to obtain modularized code (e.g., modularized code 133 and modularized code 135). Modularizing non-module code to obtain modularized code does not necessarily require any modification of the non-module code itself. Modularizing non-module code to obtain modularized code includes generating data based on the contents of the non-module code. The data associated with the modularized code is indicated in a module descriptor naming a bridge module associated with the modularized code. The module descriptor is used for exposing (for example, by exporting) the packages of the modularized code for access by other modules or non-module code. Furthermore, the module descriptor of a bridge module may include an explicit dependency on a dependency path corresponding to non-module code without exposing the non-module code. Alternatively, the module descriptor may expose non-module code. A detailed example set of operations for modularization of non-module code is described below with reference to FIG. 2.

Referring again to the illustrated example, FIG. 1B includes system 101 which is the result of modularizing non-module code 132 and non-module code 134 identified in FIG. 1A. Prior to the modularizing of non-module code 132 and non-module code 134, no standard modules in any module environment, such as module environment 102, could gain direct or indirect access to the functionality of non-module code 132-146. Specifically, standard modules 104-112 cannot depend explicitly on any of non-module code 132-146. In this example, non-module code 132 and non-module code 134, as illustrated in FIG. 1A, were modularized to obtain modularized code 133 and modularized code 135, respectively, as illustrated in FIG. 1B.

Modularization of non-module code 132 and non-module code 134 did not necessarily require any modification of non-module code 132 and non-module code 134, respectively. The modularization of non-module code 132 to obtain modularized code 133 includes identification of the packages in non-module code 132. The modularization of non-module code 132 further includes identification of the dependencies of non-module code 132 (e.g., on a dependency path and/or on other non-modules). Bridge module 122 exposes the packages of modularized code 133 (previously referred to as non-module code 132) to standard modules, other bridge modules, and other non-module code. As an example, bridge module 122 allows standard module 110 to access the packages of modularized code 133. However, bridge module 122 does not necessarily expose the explicit dependencies of modularized code 133 to other modules. For example, while the module descriptor for bridge module 122 includes an explicit dependency on a dependency path corresponding to non-module code 140, the bridge module 122 does not expose non-module code 140 to any other module. Accordingly, standard module 110, which can access the packages of modularized code 133, cannot explicitly depend on the non-module code 140. Alternative implementations may include a bridge module exposing non-module code to other modules. In a variation of the above example, bridge module 122 exposes non-module code 140 to standard module 110. The bridge module may use "requires public" keywords to depend on and expose non-module code 140 to standard module 110.

In an example, a bridge module is used for exposing non-module code to standard modules. Specifically, the bridge module exposes the non-module code, being modularized, to standard modules. Furthermore, the bridge module may expose all or a subset of other non-module code upon which the modularized code depends.

In an embodiment, non-module code can depend on packages exposed by bridge modules or by standard modules. In an example, non-module code 146 depends on packages exposed by standard module 112, for example, via an "exports" command in the Java Module System. Furthermore, non-module code 146 may access the packages of modularized code 133 that are exposed by bridge module 122 (access is not illustrated in the example FIG. 1B).

In an embodiment, bridge modules may be implemented without any standard modules. As illustrated, in FIG. 1C, system 102 includes bridge modules 122 and 124. The system 102 further includes non-module code 140, 142, 144, and 146. However, system 102 does not include any standard modules. A main method or main application which serves as an entry point for execution may be implemented in the modularized code 133 or the modularized code 135. A system without standard modules (e.g., system 102 illustrated in FIG. 1C) may be (a) a permanent configuration or (b) a temporary configuration until the system is modified to include standard modules (e.g., system 101 illustrated in FIG. 1B).

3. Development Environment Example

Embodiments, described herein, are applicable to any development environment for developing, debugging, or updating software. For purposes of explanation, specific examples reference operations performed using the Java Development Kit (JDK). Development environments other than the JDK may share some functional constructs with the JDK but not others, and most functional constructs of the JDK are not required to implement the embodiments claimed or described herein. Even if other languages use different names to refer to the same or highly similar functional constructs, a person of ordinary skill would understand how these same or highly similar functional constructs could be used in conjunction with the embodiments claimed or described herein, instead of the corresponding JDK constructs. Certain features of the JDK are described below. However, one or more embodiments include additional features not described below and/or omit features described below.

A Java program manages two kinds of information: primitive data and objects. Primitive data includes common, fundamental values such as numbers and characters. An object usually represents something more specialized or complex, such as a bank account. An object is defined by a class. A class contains methods that generally represent the operations that can be performed on objects created from that class.

Related classes may be grouped into packages. On example of a package is the java.sql package including classes for interacting with databases (SQL stands for Structured Query Language). Another example of a package is the java.awt package including classes which provide support for drawing graphics and creating GUIs (AWT stands for Abstract Windowing Toolkit). A package may expose some classes (e.g., classes that are invaluable to a developer) while hiding other classes that relate to implementation details (e.g., classes that are unlikely to be referenced by a developer). A set of exposed classes is referred to as an Application Programming Interface (API). For example, the java.awt package includes the Java Abstract Windowing Toolkit API. In another example, the java.sql package includes the Java Database Connectivity API.

A set of packages may be referred to as a class library. A class library supports the development and execution of programs. A compiler and a class library are often packaged together; class libraries can also be obtained separately through third-party vendors.

In order to develop Java programs, a compiler is required for compiling Java source code into Java class files. Java source code may be pre-defined (e.g., in a class library) or defined by a developer. A developer may generate Java source code using any tool including, but not limited to, a text editor or a full-fledged Integrated Development Environment (IDE). A compiler compiles all Java source code, whether pre-defined or developer-defined, into Java class files. The javac compiler, included in the JDK, is one example of a compiler used for compiling source code into Java class files.

Java class files (i.e., *.class files) contain bytecode representing the original source code in an efficient, portable, and architecture-neutral formal. The bytecode is executed by an implementation of the Java Virtual Machine (JVM). Hotspot, included in the JDK, is an example of a JVM implementation. The JVM implementation may execute the bytecode by an interpretation technique which includes executing one bytecode "statement" at a time. The JVM implementation may execute by the bytecode by a compilation technique which includes converting the bytecode to machine code at runtime. In the compilation technique, a different converter, for converting the bytecode to machine code, is needed for each kind of processor on which the bytecode is to be executed.

Prior to executing a Java class file, the JVM implementation verifies all of the bytecode within the Java class file. The verification ensures: (a) branches reference valid locations and (b) data is initialized and references are type-safe. Steps (a) and (b) of the verification process may be performed when a class is loaded using a class loader.

A class loader is an object responsible for first locating a binary representation of a class, and then passing the binary representation to the JVM to create a class in memory. The process of location followed by creation is known as "class loading". Class loading may be triggered by the JVM as it executes code in one class and resolves that code's references to other classes. The JVM may trigger class loading for classes as needed by a program instead of loading all classes into memory at once. Class loading may also be triggered by a Java program, because a class loader is an ordinary object whose class (java.lang.ClassLoader or a subclass) exposes methods to locate and create classes.

A Java runtime is typically associated with three or more class loaders. One class loader is a "bootstrap" class loader (also referred to as a "primordial class loader") for loading trusted classes. Another class loader is an "extension" class loader which delegates class loading to the bootstrap class loader or loads from a specified directory. The extension class loader will typically load "non-core" and/or less trusted classes. Another class loader is an "application" class loader for loading developer-defined classes. An application class loader loads classes from a namespace. The namespace may refer to a CLASSPATH. Various embodiments, described herein, refer to uses of the CLASSPATH. If a Java program creates its own class loader, it is conventional for that class loader to "delegate" to the class loaders associated with the Java runtime before that class loader attempts to locate and create classes.

Figure 2:
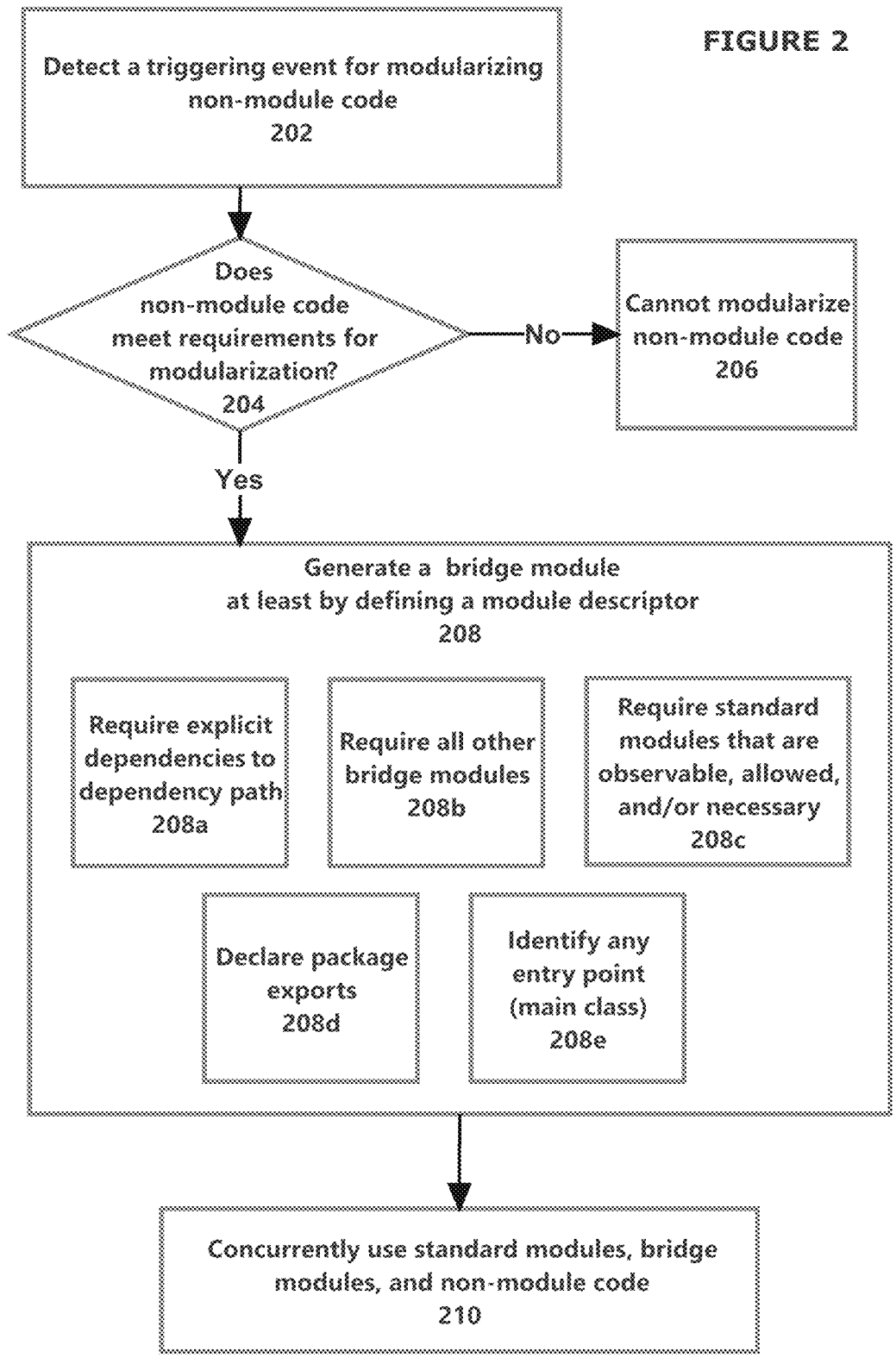
FIG. 2 illustrates a set of operations for generating a bridge module in accordance with one or more embodiments.

4. Generating a Bridge Module for Briding a Module Environment and a Non-Module Environment FIG. 2 illustrates an example set of operations for generating a bridge module for bridging a module environment and a non-module environment in accordance with one or more embodiments. The bridge module may be generated for any non-module code in a set of non-module code regardless of where the non-module code is located in a dependency path. In an example, a first non-module code depends on a second non-module code via a dependency path. Either one of the first non-module code and the second non-module code may be modularized before or without the modularization of the other one of the first non-module code and the second non-module code.

One or more operations illustrated in FIG. 2 may be modified, rearranged, or omitted all together. Accordingly, the particular sequence of operations illustrated in FIG. 2 should not be construed as limiting the scope of one or more embodiments.

Initially, a triggering event is detected for modularizing non-module code (Operation 202). In an embodiment, a triggering event is a command or operation that explicitly requests modularizing of the non-module code or implicitly requires modularizing of the non-module code. Modularization of the non-module code may be required if a command requires a modularized version of the non-module code. In an example, a module-related command, using the keyword "MODULEPATH", is to be executed. The module-related command may be a command to compile, validate, or execute a particular code base. When the command is being executed, an identifier, foo-bar.jar corresponding to the non-module code is identified as a parameter associated with the keyword "MODULEPATH." An analysis of foo-bar.jar indicates that there is no module descriptor identifying a module corresponding to foo-bar.jar. As a result of lacking a module descriptor, foo-bar.jar is determined to be non-module code. However, MODULEPATH requires a modularized version of foo-bar.jar, i.e., foo-bar.jar with a module descriptor. Since MODULEPATH requires a modularized version of foo-bar.jar, modularizing of foo-bar.jar is triggered.

In another example, a triggering event includes receiving an explicit command from a developer to modularize the first non-module code. The command may be determined as a function of a developer moving or copying a file within a system. The system is configured such that when any non-module code is moved or copied (e.g., using a Graphical User Interface or Command Line Interface) into a particular file or directory, the system triggers the modularization of that non-module code.

Subsequent to detecting a trigger for modularizing the non-module code, a determination is made as to whether the non-module code meets the requirements for modularization (Operation 204). If the non-module code does not meet the requirements for modularization, a determination is made that the first non-module cannot be modularized (Operation 206).

Different systems may implement different requirements for modularization of non-module code into modularized code. Requirements for modularizing non-module code may include, for example, one or more of:

(a) Non-module code to be modularized may not contain any duplicate packages.

(b) Non-module code to be modularized may not depend on any of a particular set of restricted module code (e.g., Java Development Kit-Internal APIs)

(c) Non-module code to be modularized may not perform reflective operations, such as, looking up classes or resources in other modules In one example, two different sets of non-module code, depended on by a particular code base, are determined to expose the same package. In response to determining that the two different sets of non-module code expose the same package, the two different sets of non-module code are not modularized.

Once a determination is made to modularize non-module code, a bridge module is generated for the non-module code. The bridge module is generated at least by defining a module descriptor, for the non-module code, that names the bridge module (Operation 208). If the module descriptor is system-defined, any deterministic naming convention may be used for selecting a name for the bridge module. In one example, the name is a function of the file name corresponding to the non-module code being modularized.

Once a module descriptor has been defined for the non-module code, the non-module code may be referred to as modularized code. Accordingly, modularizing of non-module code to obtain modularized code does not necessarily include any modification to the non-module code itself.

A module descriptor, as referred to herein, includes declarations corresponding to information about the modularized code. The declarations relate to the use and/or functionality of the modularized code. Examples of various declarations are provided below which should not be construed as limiting the scope of the claims in any way.

In one embodiment, the module descriptor declares explicit dependency of the corresponding bridge module to a dependency path (Operation 208*a*). In a first example, the non-module code is associated with a dependency path. Specifically, the non-module code depends on other non-module code identified in the dependency path. The module descriptor declares explicit dependency of the bridge module to the dependency path in response to determining that the non-module code is associated with the dependency path. In a second example, a dependency path declared by the module descriptor is determined independent of the non-module code. The dependency path may be a default and/or system-defined dependency path used for bridge modules. In a third example, the dependency path declared by the bridge module is based on a combination of dependencies of the non-module code (first example above) and system-defined dependencies that are independent of the non-module code (second example above). In a fourth example, the non-module code, being modularized, depends on two or more sets of non-module code. The module descriptor includes an explicit dependency to and/or exposes a first non-module code of the two or more sets of non-module code. The module descriptor does not include an explicit dependency to and/or does not expose a second non-module code of the two or more sets of non-module code. In another example, the non-module code depends on other non-module code or another module that is not officially supported by a particular platform. The bridge modules do not expose the non-module code or other module that is not officially supported by a particular platform. In another example, the module descriptor includes an explicit dependency on a dependency path that corresponds to at least one set of non-module code that is not used or required by the non-module code that is being modularized.

The module descriptor may explicitly depend on the dependency path itself without necessarily referring to or identifying the parameters of the dependency path. The module descriptor may be defined without even examining or identifying the parameters of the dependency path. The dependency path included in the module descriptor may refer to files (e.g., JAR files) that are neither used nor required by the non-module code being modularized.

The explicit dependencies, included in the module descriptor, may or may not be exposed to other modules within the system. In an example related to the Java Module System, "requires #CLASSPATH" may be used to declare dependence to parameters identified in the CLASSPATH without exposing the parameters to other modules. Alternatively, "requires public #CLASSPATH" may be used to declare dependence to parameters identified in the CLASSPATH and expose the parameters to other modules.

In another example, the dependencies of the non-module code may be recursively determined. The non-module code is analyzed to determine a first hierarchical layer of code on which the non-module code depends (either directly or via a dependency path). The first hierarchical layer of code is then analyzed to determine a second hierarchical layer of code upon which the first hierarchical layer of code depends. The process is recursively repeated until a base layer is reached which does not depend on any other layers. The set of recursively determined dependencies may then be included as explicit dependencies in the module descriptor.

In an embodiment, a check is performed to ensure that contents of a dependency path are not modified between (a) an initial time when a bridge module is created for non-module code including the dependency path and (b) a later time (subsequent to the initial time) when the dependency path is accessed. Specifically, contents of a dependency path may be identified and stored when creating a bridge module. At a later time, when the dependency path is accessed, the current contents are compared to the stored content. Any changes to the contents of the dependency path may trigger an alert.

In one embodiment, the module descriptor declares an explicit dependency of the bridge module to all other bridge modules (Operation 208*b*). In an example, a system maintains a listing of all bridge modules that have already been created. When a new bridge module is being created by defining a module descriptor for non-module code, the new bridge module explicitly depends on each bridge module included in the listing of bridge modules. The explicit dependencies on other bridge modules are defined such that the other bridge modules are exposed to other modules or non-module code. In an example of the Java Module System, "requires public" is used for explicitly depending on the other bridge modules and exposing the other bridge modules to other modules or non-module code.

In one example, all bridge modules are configured to explicitly depend on and expose all other bridge modules. When a standard module explicitly depends on one of the bridge modules in this configuration, all bridge modules are exposed to the standard module. Specifically, all packages exposed by all of the bridge modules are exposed to the standard module.

In an embodiment, the module descriptor declares explicit dependencies to every observable standard module, to every standard module that allows for an explicit dependence and/or to every standard module determined by the runtime environment as being necessary for the execution of an application which consists of a standard module (Operation 208*c*). In an example, a standard module exposes a package that may be depended upon by other standard modules, bridge modules, and/or non-module code. A module descriptor of the bridge module may declare an explicit dependency to the standard module that exposes the package. In another example, standard module M has an entry point enabling a user to run standard module M as an application. Standard module M requires standard module N and non-module code B, a JAR file. Furthermore, standard module N requires standard module O. The JAR file is included on the MODULEPATH and as a result, the runtime environment generates a bridge module B from the JAR file. The bridge module B is set up to require standard modules M, N, and O. If an additional standard module, P, is observable, but is not required by any of standard modules M, N, or O, then the bridge module B is not set up to require standard module P.

In an embodiment, the module descriptor declares packages being exposed by the bridge module (Operation 208d). In an example, a system traverses the contents of the non-module code being modularized. The traversal identifies all available packages. The packages are then made available for dependence by other components using a declaration identifying the packages.

In an embodiment, the module descriptor declares an entry point for initiating execution of an application (Operation 208e). In an example, a set of files includes a particular file that is an entry point for initiating execution of an application. The particular file may include a "main" method or other primary method that corresponds to a primary set of operations within the sets of operations defined in the sets of files.

In an embodiment, defining a module descriptor for non-module code, as described above with reference to Operation 208, results in modularized code corresponding to a bridge module. The module descriptor of the bridge module describes the declarations associated with the modularized code.

In an embodiment, a combination of standard modules, bridge modules, and non-module code form a code base. Using the code base involves concurrently using standard modules, bridge modules, and non-module code (Operation 210). In an example, the code base may be compiled, validated, and/or executed. The standard modules may produce results based, in part, on operations performed using non-module code.

In an embodiment, the modularized code, corresponding to bridge modules, may be fully analyzed to determine the actual code external to the modularized code that is used and/or required by the modularized code. Determining the actual code may involve a recursive set of operations to identify a full hierarchy of code based on code dependencies. The explicit dependency of the bridge module on a dependency path may be replaced by explicit dependencies on only the actual code that is used and/or required.

5. Example Embodiments

In an embodiment, operations include: identifying a first non-module code, wherein the first non-module code does not correspond to any of a plurality of modules; generating a first module for the first non-module code; and wherein the generating operation comprises: defining a module descriptor that (a) corresponds to the first module and (b) comprises an explicit dependency based on a namespace corresponding to one or more sets of non-module code. The namespace may include a dependency path corresponding to the one or more sets of non-module code. The operations may further include: prior to generating the first module, determining that the first non-module code is associated with the namespace; and wherein defining the module descriptor to comprise the explicit dependency based on the namespace is responsive to determining that the first non-module code was associated with the namespace. The operations may further include: determining the explicit dependency, for including in the module descriptor, independent of any content or dependency of the first non-module code. The explicit dependency, in the module descriptor, may explicitly refer to the namespace without explicitly referring to the one or more sets of non-module code corresponding to the namespace. The explicit dependency, in the module descriptor, may explicitly refer to a second non-module code selected from the one or more sets of non-module code corresponding to the namespace. The one or more sets of non-module code corresponding to the namespace may include a second non-module code that is not used or required by the first non-module code, and wherein the namespace, in the module descriptor, allows the first module to access the second non-module code even though the second non-module code is not used or required by the first non-module code. The first module as referred to above may be a bridge module as described herein. The module descriptor, corresponding to the first module, may be defined by a system in response to the system detecting occurrence of a triggering event. The operations may further include: receiving a command requiring modularization of the first non-module code; and wherein generating the first module for the first non-module code is responsive to receiving the command. The operations may further include: determining that the first non-module code does not correspond to any of the plurality of modules; and wherein generating the first module for the first non-module code is responsive at least to determining that the first non-module code does not correspond to any of the plurality of modules. The operations may further include: receiving a command for executing a module operation, the command comprising the first non-module code as a parameter; and wherein generating the first module for the first non-module code is responsive to receiving the command. The operations may further include: receiving a command comprising a MODULEPATH keyword that refers to an identifier for the first non-module code as a parameter; and wherein generating the first module for the first non-module code is responsive to receiving the command. The plurality of modules may include (a) a first set of standard modules that are restricted from explicitly depending on the namespace corresponding to the one or more sets of non-module code and (b) a second set of bridge modules that are not restricted from explicitly depending on the namespace corresponding to the one or more sets of non-module code. When the first module is a bridge module, the operations may further include: subsequent to generating the bridge: successfully validating a particular standard module with an explicit dependency on the bridge module; and wherein the particular standard module is restricted from including the explicit dependency on the namespace. The operations may further include: defining the module descriptor to include a particular explicit dependency based on one or more of: each module in the plurality of modules that allows for explicit dependency by the first module; each module in the plurality of modules that is necessary for execution of an application which consists of a standard module; each observable standard module in the plurality of modules; each standard module enumerated by a developer; and each bridge module other than the first module. The operations may further include: defining the module descriptor to allow every package in the first non-module code to be accessed by any standard module, any bridge module, and any non-module code. Generating the first module for the first non-module code may be responsive at least to determining: determining that the first non-module code does not contain any duplicate packages; determining that the first non-module code does not depend on any of a set of restricted modules of the plurality of modules; and determining that the first non-module code does not look up classes or resources in other modules of the plurality of modules.

In an embodiment, operations include: executing an operation on a code base corresponding to a plurality of modules comprising: a first set of modules that are not restricted from including an explicit dependency based on a namespace corresponding to one or more sets of non-module code; and a second set of modules that are restricted from including the explicit dependency based on the namespace corresponding to the one or more sets of non-module code; and wherein at least one of the second set of modules explicitly depends on at least one of the first set of modules. The first of modules may consist of one or more bridge modules. The second set of modules may consist of one or more standard modules. The namespace may include a dependency path. The namespace may include a dependency path corresponding to the one or more sets of non-module code. A particular module, in the first set of modules may include a module descriptor, wherein the module descriptor includes the explicit dependency based on the namespace corresponding to the one or more sets of non-module code.

FIGS. 3A-3D illustrate detailed examples for purposes of clarity. Components and/or operations described below should be understood as specifics example which may not be applicable to certain embodiments. Accordingly, components and/or operations described below should not be construed as limiting the scope of any of the claims. Furthermore, the example is not intended to present a complete set of information. For example, only a subset of the content associated with modules or module descriptors is described below.

Figure 3A:
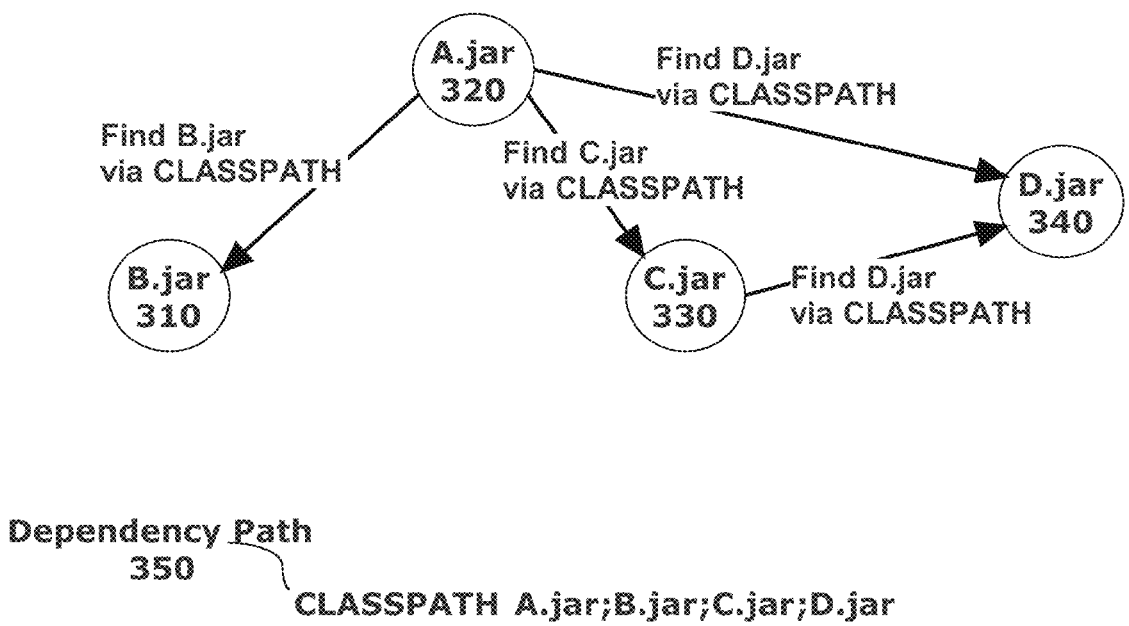
Figure 3B:
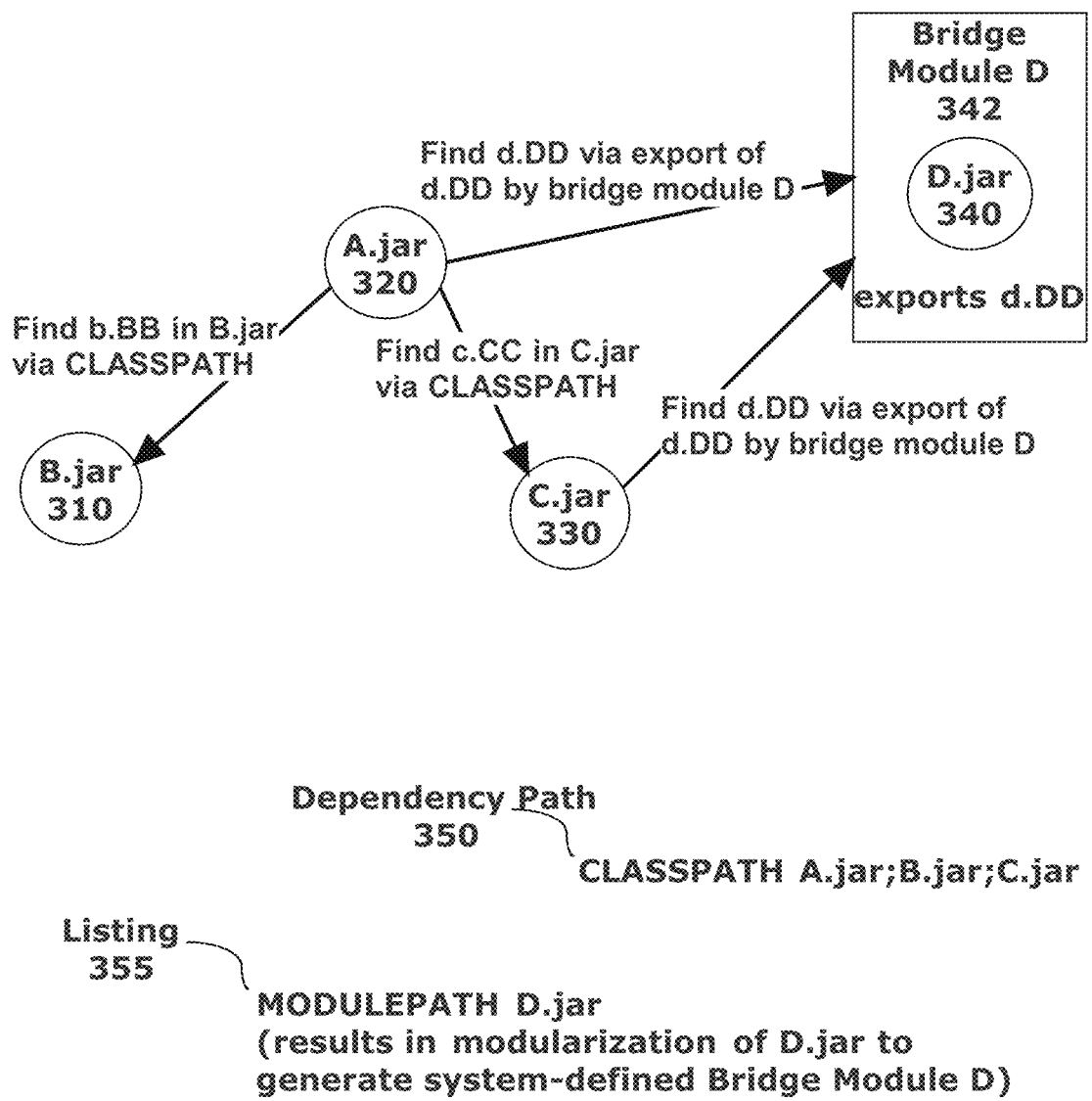
Figure 3C:
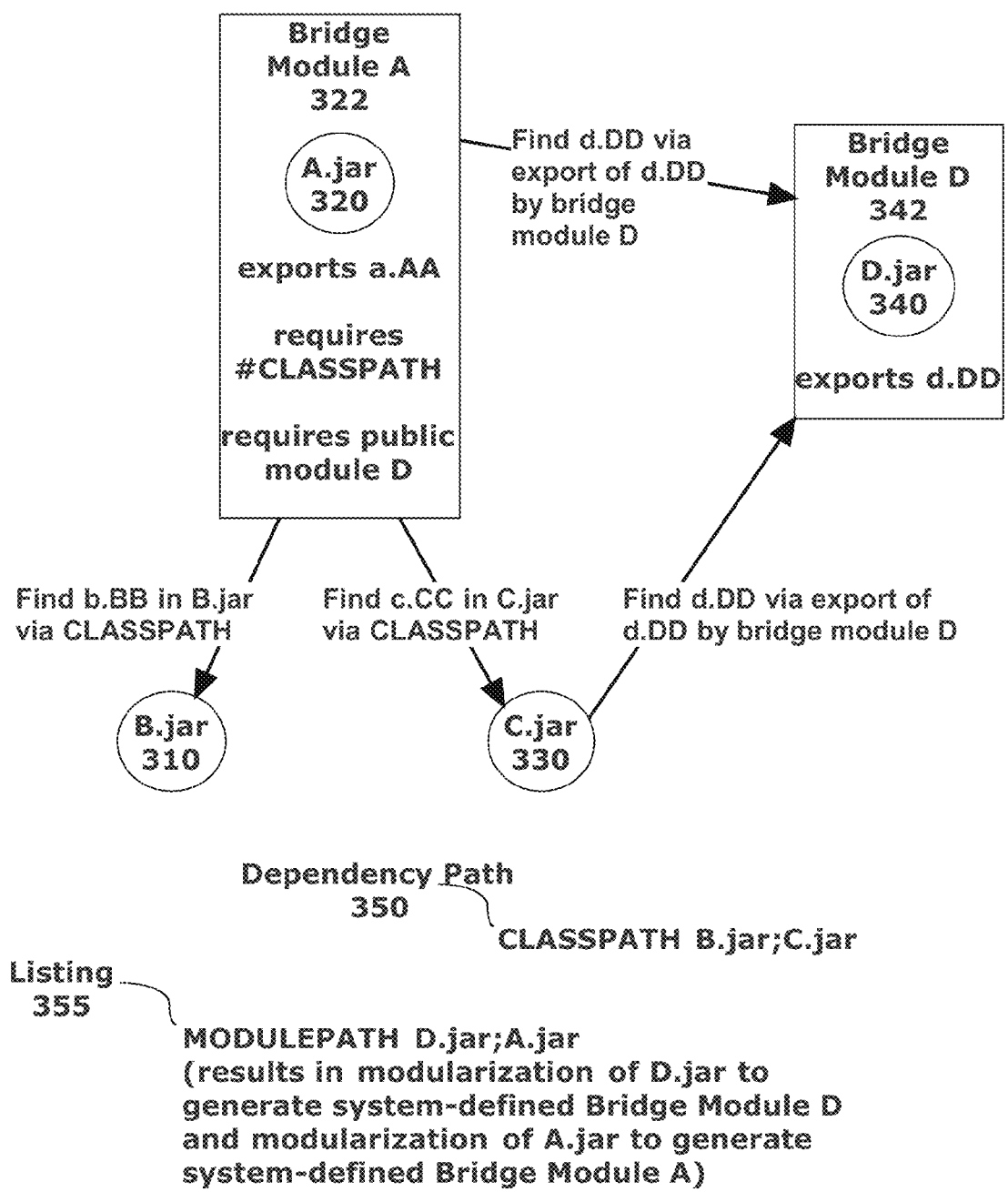

In an embodiment, FIG. 3A illustrates a non-module system, components of which are being migrated to a module system. Specifically, non-module code within the non-module system is being modularized to generate bridge modules.

Code description 304 describes characteristics of four files A.jar 320, B.jar 310, C.jar 330, and D.jar 340. A.jar includes class a.AA, B.jar includes class b.BB, c.jar includes class c.CC, and D.jar includes class d.DD. Class a.AA creates instances of b.BB and c.CC, and accordingly, depends on b.BB and c.CC. Class c.CC extends d.DD, and accordingly, depends on d.DD. A software development environment searches for and loads classes as needed by the various files.

In an initial operational state T0, the environment variable CLASSPATH, identified as dependency path 350, includes A.jar; B.jar; C.jar; D.jar. When operations (e.g., compiling, validating, or executing) are being executed, the software development environment finds all files using the CLASS-PATH.

At time T1, the operational state is illustrated after modularization of D.jar 340. The modularization of D.jar 340 is triggered by adding D.jar 340 to the MODULEPATH as illustrated in listing 355. The modularization of D.jar 340 results in defining a module descriptor that names bridge module D 342 based on the file name "D.jar." The module descriptor for bridge module 342 also exports d.DD. The software development environment now finds d.DD, when needed for A.jar and C.jar, based on the export by bridge module D 342. No modification is needed for A.jar 320 and C.jar 330 for the software development environment to find d.DD via the export function of bridge module D 342 rather than the CLASSPATH. D.jar 340 cannot be found using the CLASSPATH as D.jar 340 has been removed from the CLASSPATH.

At time T2, the operational state is illustrated after modularization of A.jar 320. The modularization of A.jar 320 is triggered by adding A.jar 320 to the MODULEPATH as illustrated in listing 355. The modularization of Ajar 320 results in defining a module descriptor that names bridge module A 322 based on the file name "A.jar" and further exports a.AA. The software development environment may find a.AA, if and when needed, based on the export by bridge module A 322. A.jar 320 cannot be found using the CLASSPATH as A.jar 320 has been removed from the CLASSPATH.

At time T3, the operational state is illustrated after the addition of standard module 360 and standard module 370. Standard module 360 explicitly depends on bridge module A 322. The software development environment uses the "requires" declaration of standard module 360 and the "exports" declaration of bridge module A 322 to identify A.jar 320 when needed for standard module 360. Standard module 370 explicitly depends on bridge module 342. The software development environment uses the "requires" declaration of standard module 370 and the "exports" declaration of bridge module D 342 to identify D.jar 340 when needed for standard module 370. The bridge modules (bridge module A 322 and bridge module D 342) expose non-module code (A.jar 320 and D.jar 340) to the standard modules. Furthermore, the bridge modules allow the standard modules to complete operations indirectly using the non-module code that is not exposed to the standard modules. Specifically, bridge module A 322 allows standard module 360 to access A.jar 320. A.jar 320 may use B.jar 310 and C.jar 330 to perform operations for obtaining results which may be passed on to the standard modules 360 and 370.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

In an embodiment, the operations include identifying a first non-module code, wherein the first non-module code does not correspond to any of a plurality of modules; generating a first module for the first non-module code; and wherein the generating operation comprises: defining a module descriptor that (a) corresponds to the first module and (b) comprises an explicit dependency based on a namespace corresponding to one or more sets of non-module code. In an embodiment, the namespace comprises a dependency path corresponding to the one or more sets of non-module code. In an embodiment, the operations further comprise: prior to generating the first module, determining that the first non-module code is associated with the namespace; and wherein defining the module descriptor to comprise the explicit dependency based on the namespace is responsive to determining that the first non-module code was associated with the namespace. In an embodiment, the operations further comprise: determining the explicit dependency, for including in the module descriptor, independent of any content or dependency of the first non-module code. In an embodiment, the explicit dependency, in the module descriptor, explicitly refers to the namespace without explicitly referring to the one or more sets of non-module code corresponding to the namespace. In an embodiment, the explicit dependency, in the module descriptor, explicitly refers to a second non-module code selected from the one or more sets of non-module code corresponding to the namespace. In an embodiment, the one or more sets of non-module code corresponding to the namespace includes a second non-module code that is not used or required by the first non-module code, and wherein the namespace, in the module descriptor, allows the first module to access the second non-module code even though the second non-module code is not used or required by the first non-module code. In an embodiment, the first module is a bridge module. In an embodiment, the module descriptor, corresponding to the first module, is defined by a system in response to the system detecting occurrence of a triggering event. In an embodiment, the operations further comprise: receiving a command requiring modularization of the first non-module code; and wherein generating the first module for the first non-module code is responsive to receiving the command. In an embodiment, the operations further comprise: determining that the first non-module code does not correspond to any of the plurality of modules; and wherein generating the first module for the first non-module code is responsive at least to determining that the first non-module code does not correspond to any of the plurality of modules. In an embodiment, the operations further comprise: receiving a command for executing a module operation, the command comprising the first non-module code as a parameter; and wherein generating the first module for the first non-module code is responsive to receiving the command. In an embodiment, the operations further comprise: receiving a command comprising a MODULEPATH keyword that refers to an identifier for the first non-module code as a parameter; and wherein generating the first module for the first non-module code is responsive to receiving the command. In an embodiment, the plurality of modules comprises (a) a first set of standard modules that are restricted from explicitly depending on the namespace corresponding to the one or more sets of non-module code and (b) a second set of bridge modules that are not restricted from explicitly depending on the namespace corresponding to the one or more sets of non-module code. In an embodiment, the first module is a bridge module, and wherein the operations further comprise: subsequent to generating the bridge: successfully validating a particular standard module with an explicit dependency on the bridge module; and wherein the particular standard module is restricted from including the explicit dependency on the namespace. In an embodiment, the operations further comprise: defining the module descriptor to include a particular explicit dependency based on one or more of: each module in the plurality of modules that allows for explicit dependency by the first module; each module in the plurality of modules that is necessary for execution of an application which consists of a standard module; each observable standard module in the plurality of modules; each standard module enumerated by a developer; and each bridge module other than the first module. In an embodiment, the operations further comprise: defining the module descriptor to allow every package in the first non-module code to be accessed by any standard module, any bridge module, and any non-module code. In an embodiment, generating the first module for the first non-module code is responsive at least to determining: determining that the first non-module code does not contain any duplicate packages; determining that the first non-module code does not depend on any of a set of restricted modules of the plurality of modules; and determining that the first non-module code does not look up classes or resources in other modules of the plurality of modules.

In an embodiment, the operations include executing an operation on a code base corresponding to a plurality of modules comprising: a first set of modules that are not restricted from including an explicit dependency based on a namespace corresponding to one or more sets of non-module code; and a second set of modules that are restricted from including the explicit dependency based on the namespace corresponding to the one or more sets of non-module code; and wherein at least one of the second set of modules explicitly depends on at least one of the first set of modules. In an embodiment, the first set of modules consists of one or more bridge modules. In an embodiment, the second set of modules consists of one or more standard modules. In an embodiment, the namespace comprises a dependency path. In an embodiment, the namespace comprises a dependency path corresponding to the one or more sets of non-module code. In an embodiment, a particular module, in the first set of modules, comprises a module descriptor; wherein the module descriptor comprises the explicit dependency based on the namespace corresponding to one or more sets of non-module code.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
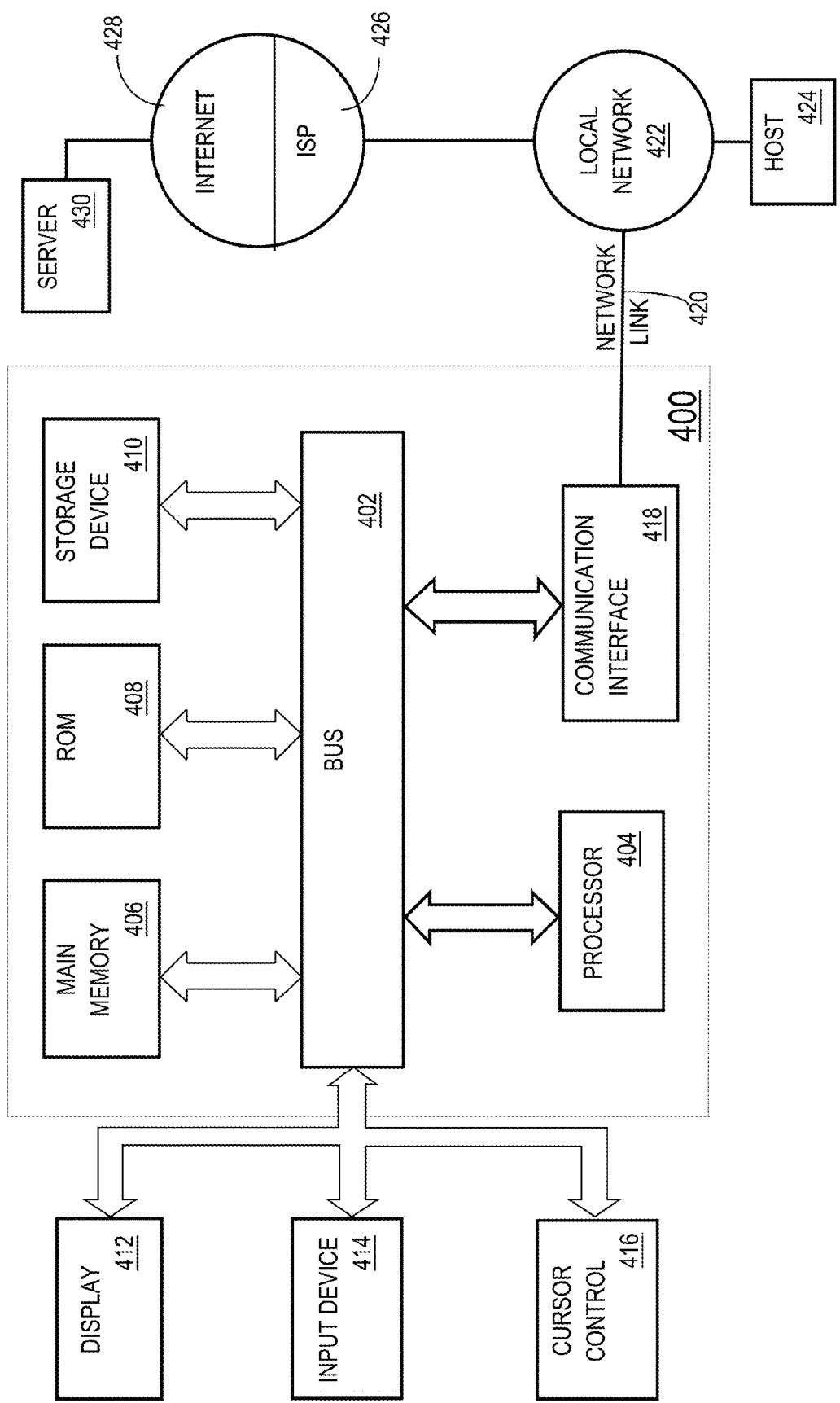
FIG. 4 illustrates a system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another kind of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding kind of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various kinds of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying a code base comprising:
      one or more sets of non-module code that are not associated with any module descriptors;
      a first module corresponding to:
         a first module descriptor that declares a first set of one or more explicit dependencies, wherein the first module descriptor includes an explicit dependency based on a namespace corresponding to the one or more sets of non-module code;
         a first set of executable code;
      a second module corresponding to:
         a second module descriptor that declares a second set of one or more explicit dependencies, wherein the second module descriptor is restricted from including the explicit dependency based on the namespace, and wherein the second module descriptor includes an explicit dependency based on the first module;
         a second set of executable code;
   prior to executing the first set of executable code and the second set of executable code, enforcing the first set of explicit dependencies and the second set of explicit dependencies by:
      verifying that actual dependencies of the first set of executable code are included in the first set of explicit dependencies; and
      verifying that actual dependencies of the second set of executable code are included in the second set of explicit dependencies;
   wherein the method is executed by at least one device including a hardware processor.

2. The method of claim 1, wherein the first module is a bridge module.

3. The method of claim 1, wherein the second module is a standard module.

4. The method of claim 1, the namespace comprises a dependency path.

5. The method of claim 1, wherein the namespace comprises a dependency path corresponding to the one or more sets of non-module code.

6. The method of claim 1, wherein the enforcing operation is based on module descriptors corresponding to a module system.

7. A system comprising:
   at least one device including a hardware processor;
   the system being configured to perform operations comprising:
   identifying a code base comprising:
      one or more sets of non-module code that are not associated with any module descriptors;
      a first module corresponding to:
         a first module descriptor that declares a first set of one or more explicit dependencies, wherein the first module descriptor includes an explicit dependency based on a namespace corresponding to the one or more sets of non-module code;
         a first set of executable code;
      a second module corresponding to:
         a second module descriptor that declares a second set of one or more explicit dependencies, wherein the second module descriptor is restricted from including the explicit dependency based on the namespace, and wherein the second module descriptor includes an explicit dependency based on the first module;
         a second set of executable code;
   prior to executing the first set of executable code and the second set of executable code, enforcing the first set of explicit dependencies and the second set of explicit dependencies by:
      verifying that actual dependencies of the first set of executable code are included in the first set of explicit dependencies; and
      verifying that actual dependencies of the second set of executable code are included in the second set of explicit dependencies.

8. The system of claim 7, wherein the first module is a bridge module.

9. The system of claim 7, wherein the second module is a standard module.

10. The system of claim 7, wherein the namespace comprises a dependency path.

11. The system of claim 7, wherein the namespace comprises a dependency path corresponding to the one or more sets of non-module code.

12. The system of claim 7, wherein the enforcing operation is based on module descriptors corresponding to a module system.

13. A non-transitory computer readable medium comprising instructions which, when executed by one or more hardware processors, cause performance of operations comprising:
   identifying a code base comprising:
      one or more sets of non-module code that are not associated with any module descriptors;
      a first module corresponding to:
         a first module descriptor that declares a first set of one or more explicit dependencies, wherein the first module descriptor includes an explicit dependency based on a namespace corresponding to the one or more sets of non-module code;
         a first set of executable code;
      a second module corresponding to:
         a second module descriptor that declares a second set of one or more explicit dependencies, wherein the second module descriptor is restricted from including the explicit dependency based on the namespace, and wherein the second module descriptor includes an explicit dependency based on the first module;
         a second set of executable code;
   prior to executing the first set of executable code and the second set of executable code, enforcing the first set of explicit dependencies and the second set of explicit dependencies by:
      verifying that actual dependencies of the first set of executable code are included in the first set of explicit dependencies; and
      verifying that actual dependencies of the second set of executable code are included in the second set of explicit dependencies.

14. The medium of claim 13, wherein the first module is a bridge module.

15. The medium of claim 13, wherein the second module is a standard module.

16. The medium of claim 13, wherein the namespace comprises a dependency path.

17. The medium of claim 13, wherein the namespace comprises a dependency path corresponding to the one or more sets of non-module code.

18. The medium of claim 13, wherein the enforcing operation is based on module descriptors corresponding to a module system.

19. The medium of claim 18, wherein the module descriptors are defined independently from sets of executable code.

\* \* \* \* \*

UNITED STATES PATENT AND TRADEMARK OFFICE
CERTIFICATE OF CORRECTION

| | |
|---|---|
| PATENT NO. | : 9,626,171 B2 |
| APPLICATION NO. | : 14/808590 |
| DATED | : April 18, 2017 |
| INVENTOR(S) | : Buckley et al. |

It is certified that error appears in the above-identified patent and that said Letters Patent is hereby corrected as shown below:

In Column 8, Line 1, delete "Briding" and insert -- Bridging --, therefor.

In Column 9, Line 3, after "APIs)" insert -- . --.

In Column 9, Line 6, after "modules" insert -- . --.

In Column 13, Line 47, delete "c.jar" and insert -- C.jar --, therefor.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*